US012657421B2

(12) United States Patent
De Backer et al.

(10) Patent No.: US 12,657,421 B2
(45) Date of Patent: Jun. 16, 2026

(54) METHOD OF DETECTION OF UNAUTHORIZED INTERVENTION IN AN IDENTIFICATION STRUCTURE WHICH IS DESIGNED TO AID SUCH DETECTION

(71) Applicant: AVERY DENNISON RETAIL INFORMATION SERVICES LLC, Mentor, OH (US)

(72) Inventors: Mathieu De Backer, Grottammare (IT); William Toney, Frisco, TX (US); Renee Micek, Springboro, OH (US); Carol L. Callahan, Greensboro, NC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/681,725

(22) PCT Filed: Sep. 26, 2022

(86) PCT No.: PCT/US2022/077009
§ 371 (c)(1),
(2) Date: Feb. 6, 2024

(87) PCT Pub. No.: WO2023/049891
PCT Pub. Date: Mar. 30, 2023

(65) Prior Publication Data
US 2024/0338545 A1 Oct. 10, 2024

Related U.S. Application Data

(60) Provisional application No. 63/248,758, filed on Sep. 27, 2021.

(51) Int. Cl.
*G06K 19/073* (2006.01)

(52) U.S. Cl.
CPC .............................. *G06K 19/07372* (2013.01)

(58) Field of Classification Search
CPC ................................................ G06K 19/07372
(Continued)

(56) References Cited

U.S. PATENT DOCUMENTS 6,869,015 B2 * 3/2005 Cummings .......... G06K 7/1473
235/462.11
7,095,324 B2 * 8/2006 Conwell .............. G06K 19/073
340/572.1
(Continued)

FOREIGN PATENT DOCUMENTS

CN 210983472 U 7/2020
CN 213149803 U 5/2021
(Continued)

OTHER PUBLICATIONS

International Search Report and Written Opinion dated Jan. 26, 2023 issued in corresponding IA No. PCT/US2022/077009 filed Sep. 26, 2022.

(Continued)

*Primary Examiner* — Ahshik Kim

(57) ABSTRACT

A method of detection of unauthorized intervention into an identification structure is provided. The method includes configuring the identification structure such that the identification structure interacts with the intervention such as a physical intervention, or mechanical intervention, or electrical intervention. Further, the method involves propagating the intervention along the identification structure in such a control as to cause a detectable alteration in any predetermined attributes associated with the identification structure including a physical attribute, mechanical attribute, electrical attribute, and an optical attribute. Finally, the alteration (Continued)

in the attributes is detected by visual, electrical, or optical assessments or a combination of assessments.

34 Claims, 5 Drawing Sheets

(58) Field of Classification Search
USPC ......................................................... 235/492
See application file for complete search history.

(56) References Cited

U.S. PATENT DOCUMENTS

| | | | |
|---|---|---|---|
| 7,535,373 | B2 | 5/2009 | Dalzell |
| 7,804,411 | B2 | 9/2010 | Copeland |
| 7,812,726 | B2 * | 10/2010 | Barlow, Jr. .......... G08B 13/126 |
| | | | 340/572.1 |
| 8,093,996 | B2 | 1/2012 | Heurtier |
| 8,330,191 | B2 | 12/2012 | Hoofman et al. |
| 8,991,709 | B2 * | 3/2015 | Mieslinger ....... G06K 19/07749 |
| | | | 235/492 |
| 9,299,586 | B1 | 3/2016 | West et al. |
| 9,390,603 | B2 | 7/2016 | Li et al. |
| 2002/0135481 | A1 | 9/2002 | Conwell et al. |
| 2009/0121876 | A1 | 5/2009 | Satoh et al. |
| 2009/0231139 | A1 | 9/2009 | Heurtier |
| 2012/0112450 | A1 | 5/2012 | Aigner et al. |
| 2014/0110486 | A1 * | 4/2014 | Nemet ............. G06K 19/06046 |
| | | | 235/494 |
| 2014/0263659 | A1 | 9/2014 | Kervinen et al. |
| 2017/0021987 | A1 * | 1/2017 | Sokol ..................... A45C 11/16 |
| 2019/0206212 | A1 * | 7/2019 | Forster ................ G02F 1/13718 |

FOREIGN PATENT DOCUMENTS

| | | |
|---|---|---|
| DE | 202020104083 U1 | 8/2020 |
| EP | 2019998 | 8/2011 |
| EP | 3152741 | 4/2017 |
| EP | 3701423 | 10/2021 |
| JP | 2005-165511 | 6/2005 |
| JP | 2008-521098 | 6/2008 |
| JP | 2009-217175 | 9/2009 |
| WO | 2006/055653 | 5/2006 |
| WO | 2013/076352 | 5/2013 |
| WO | 2018/126137 | 7/2018 |
| WO | 2020/237251 | 11/2020 |

OTHER PUBLICATIONS

International Preliminary Report on Patentability dated Apr. 11, 2024 issued in corresponding IA No. PCT/US2022/077009 filed Sep. 26, 2022.

* cited by examiner

METHOD OF DETECTION OF UNAUTHORIZED INTERVENTION IN AN IDENTIFICATION STRUCTURE WHICH IS DESIGNED TO AID SUCH DETECTION

CROSS-REFERENCE TO RELATED APPLICATION

The present application is a national stage application under 35 U.S.C. § 371 of International Application No. PCT/US2022/077009 filed Sep. 26, 2022, which claims the benefit of U.S. Provisional Patent Application No. 63/248, 758 filed Sep. 27, 2021, each of which is incorporated besoin by reference berein in its entirety.

FIELD

The subject matter described herein relates to methods for detecting an unauthorized intervention or interference in, or into, an identification structure. Particularly, the subject matter described herein relates to detection of physical and electrical interventions or interferences in, or into, an identification structure. The subject matter described herein is particularly useful for tracking and monitoring merchandise items (e.g., items or products in commerce) in the supply chain, identification of merchandise items, securing merchandise items and the like.

BACKGROUND

The growing occurrences of counterfeit goods cause significant losses not just for businesses (e.g. brands) but also for consumers who can bear the brunt of illegitimate and substandard goods. Several interventions are typically used to introduce counterfeits into the circulation of legitimate and authentic products and merchandise. Some of the interventions include: physically replacing authentic products with counterfeit products, and within the supply and logistics chain, by some kind of tampering or forgery, including breaking open packaging, leaving little or no evidence of such illegitimate intervention.

Typically, in order to reduce counterfeiting, various types of labels, tags and tickets are affixed to the items to identify the product and to authenticate goods and products. Various difficult-to-duplicate features have been used in an attempt to introduce anti-counterfeiting attributes and/or tamper proof solutions to labels and packaging. RFID tags have also been used in this context to help prevent counterfeiting and provide authentication to the end user/recipient.

Although anti-counterfeiting techniques such as one-dimensional and two-dimensional barcode tags, laser tags, anti-counterfeiting bottle caps, and anti-counterfeiting ink printing have emerged, forgery and counterfeiting remain unabated. This is due the fact that some of these anti-counterfeiting measures do not markedly add to the difficulty in forgery, allowing criminals to crack such measures. In recent years, due to the advancement of RFID-based electronic anti-counterfeiting technology, many product manufacturers are turning to RFID technology. However, instances of breaching RFID technology by electronic or electrical interventions for tampering or forgery have been reported. Moreover, RFID tags are not always convenient to use, especially when a reader fails. For example, a cellular phone cannot be used to scan RFID tags and therefore cannot be used as a backup if a reader(s) fails.

In addition to counterfeiting, theft, diversion, and shoplifting from retail stores or pilferage of merchandise from supply and distribution channels or outlets is also on the rise. Typically, Electronic Article Surveillance (EAS) Systems (RF-Radio frequency or AM-Acousto-Magnetic type) are used for asset protection and/or preventing or detecting theft, diversion, or shoplifting. Examples of such systems include EAS tags that pin through an item, labels attached to the item's tags, and wire loops attached to the item. In each of these systems, all items are tagged with an EAS security tag upon being received in the store and must be deactivated upon purchase. EAS-enabled stores have gate readers at the entry/exit points that generate a field around the area to detect EAS transponders that have not been deactivated. However, EAS has limitations: it cannot identify an associated item as it lacks memory, making post-theft reconciliation/inventory accuracy difficult to achieve.

In view of the above, there is a need for a broad use and cost effective solution that will reduce counterfeiting, prevent tampering, and reduce pilferage and shoplifting with the additional advantage of real-time monitoring of movements of goods from source to destination and having reduced environmental impact. The solution should offer a unified branding capability inclusive of security for loss prevention, item-level tracking, inventory accuracy and satisfying shopping experience for customers and be digitally compatible at the same time.

Therefore, it is an object of this disclosure to provide broad use and cost effective solutions that will reduce counterfeiting, prevent tampering, and reduce pilferage and shoplifting with the additional advantage of real-time monitoring of movements of goods from source to destination and having reduced environmental impact and methods of making and using thereof.

It is further an object of this to disclosure to offer solutions as defined above that provide a unified branding capability inclusive of security for loss prevention, item-level tracking, inventory accuracy, and customer satisfaction/engagement, and wherein the solutions are digitally compatible and methods of making and using thereof.

SUMMARY

Solutions for detecting unauthorized intervention with an identification structure, and methods of making and using thereof, are described herein. In some embodiments, the solutions and methods include configuring the identification structure such that the identification structure interacts with the intervention, the intervention being any of a physical intervention, an electrical intervention or any combinations thereof. In some embodiments, the intervention is propagated along the identification structure in such a way as to cause a detectable alteration in one or more predetermined attributes associated with the identification structure. In some embodiments, the attribute is a physical attribute, a mechanical attribute, an electrical attribute, an optical attribute, or any combinations thereof. In some embodiments, the solutions and methods conclude with detection of the alteration in the predetermined attributes by physical, mechanical, electrical, or optical assessment, or by a combination of assessments.

In some embodiments, the intervention can be a physical, mechanical, or electrical intervention or combinations thereof, and the detection can be done by one or more of a visual assessment, an electrical assessment, an optical assessment, or by a combination of assessments.

In some embodiments, the identification structure is, or includes or contains, a plurality of layers, e.g., stacked together, a plurality of identification elements including physical, electrical, or optical elements selectively placed along different layers of the structure for interaction with the intervention and one or more propagation elements for propagating the intervention along different layers of the identification structure in such a manner as to cause a detectable alteration in any combination of the predetermined attributes of the respective identification elements.

The embodiments described below are not intended to be exhaustive or to limit the scope of the disclosure to the precise forms disclosed in the following detailed description. Rather, the embodiments are chosen and described so that others skilled in the art may appreciate and understand the principles and practices of the present disclosure.

In this respect, it is to be understood that the scope of this disclosure is not limited in its application to the details of construction and to the arrangements of the components set forth in the following description or illustrated in the drawings. The disclosure is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

These, as well as other objects and advantages of this disclosure, will be more completely understood and appreciated by referring to the following more detailed description of the presently preferred exemplary embodiments in conjunction with the accompanying drawings.

DETAILED DESCRIPTION

I. Definitions

Figure 1:
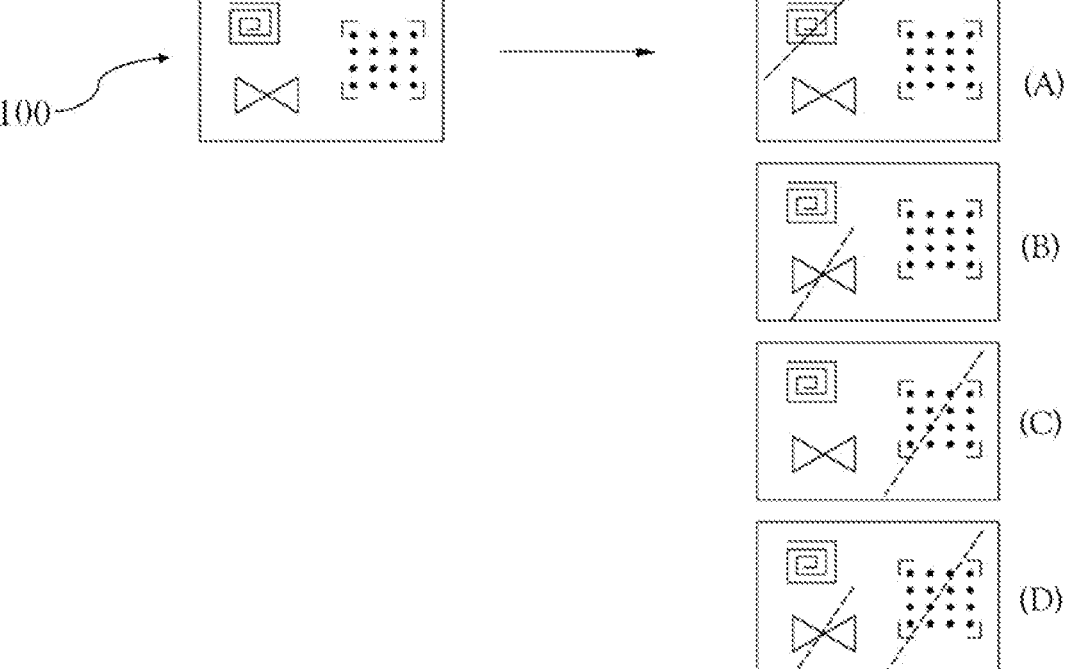
FIG. 1 depicts a block diagram of an identification structure to illustrate how various kinds of interventions may affect different elements of the identification structure.

"Intervention", as used herein, generally refers to any act of unauthorized tampering or otherwise committing a fraud or defeating any security measures on any product, item, goods, packaging, container and/or merchandise of any nature so as to result in pilferage, pass off wrong or inferior products as original, theft or shoplifting.

"Physical Intervention", as used herein, generally refers to one or more acts of removing, modifying, replacing, covering, mechanical force pulling, tearing, twisting, disabling, stretching, destructing, disrupting, displacing heating or peeling apart layers of the identification structure. This may also include defeating a security measure of any kind available or associated with a product, good, merchandise, item, package and/or container and the like. This may also include weakening a packaging bearing the identification structure.

"Electrical Intervention", as used herein, generally refers to any deployment or use of an electrical and/or magnetic field so to defeat or alter security measures on the identification structure.

"Propagation", as used herein, generally refers to the distribution/dissemination of the intervention in a manner so as to channel the intervention in one or more predetermined or specific ways along a specific pathway such that the intervention impacts/affects either one or a combination of identification elements and creates(s) one or more alterations in any of the predetermined attributes of any one or a combination of different identification elements bearing the attributes.

"Control", as used herein, generally refers to managing and/or manipulating the propagation of the intervention as well as the impact of the intervention in creating a series of alterations on predetermined attributes associated with the identification structure. Control may also relate to properties of different elements and their relative placement along the different layers. For "control", more than one path may be present which may be designed to interact with different forms of tampering or interventions and that in turn may interact with different elements of the identification structure.

"Detectable alteration", as used herein, generally refers to any alteration in any of the predetermined attributes that can be detected and measured by one or more methods. The alteration can relate to disabling, or changing a parameter or changing a property of an associated element subjected to intervention.

II. Methods and Apparatus

The solutions, apparatuses, and methods disclosed herein are described by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application.

In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present subject matter generally relates to identification structures such as a label, ticket or tag. The identification structure may serve multiple purposes including product identification, inventorying of products, theft detection and/or tamper evidence. Typically, different independent markers associated with each of the above mentioned functions are separately used on the products. However, the installation of each of these markers sequentially increases assembly time during manufacturing and may increase the chances of error while assembling these markers. Therefore, in some embodiments, all the desired markers are installed simultaneously. Moreover, while the majority of the existing identification structures are configured solely as tamper evident, tamper resistant or tamper proof labels, others may be configured for performing both tamper evident and tamper proof functions. Further, the existing tamper proof structures are complex and are configured to perform the tamper proof function in isolation and not in conjunction with other identification or theft-proof features such as RFID, RFID-EAS and the like.

In one embodiment, the identification structure is, or includes or contains, a plurality of layers stacked together/held together by a suitable means. In some embodiments, the plurality of layers includes a top layer and one more layers underlying the top layer. In an exemplary embodiment, the top layer is directly secured to the one or more underlying layers using a functional adhesive. In other embodiments, the top layer may be separated from the underlying layers by a waterproof layer or a waterproof coating. In some embodiments, the top layer is provided with one or more identification elements to aid in the identification of unauthorized tampering. In some other embodiments, the one or more layers of the identification structure are provided with a combination of two or more identification elements for performing the above-mentioned functions and to aid in the identification of any unauthorized tampering. In one embodiment, the two or more identification elements are selected from a combination of optical elements, physical elements and electrical elements. In some embodiments, each of the identification elements is selectively positioned across different layers of the plurality of layers of the identification structure for carrying out their respective functions and for additionally contributing to detection/identification of any unauthorized intervention. In one embodiment, one or more optical elements and one or more physical elements may be disposed in proximity to each other on a top layer of the identification structure, and one or more electrical elements may be disposed on a layer underlying the top layer. In some embodiments, the layers containing the two or more identification elements are adhesively secured to one another, and a release liner is provided underlying the upper layers of the identification structure.

In one embodiment, the one or more optical elements are, or may include or contain, symbols or patterns adapted to be scanned by an optical scanning device (e.g., machine readable elements or human readable elements). Examples include, but are not limited to, quick response code (QR code), a bar code (e.g., 2D bar code), surface texture, color, hologram, encapsulated ink and indicia, and combinations thereof. The optical elements serve as authentication members for enabling consumers to identify if the products to which the identification structure is secured are genuine or authentic. In one embodiment, the one or more optical elements are provided on the top layer of the identification structure.

In one embodiment, the one or more physical elements formed on the identification structure are selected from one or more of cuts, perforation, weakened scoring, slits, embossing and the like. In one embodiment, one or more cuts are formed at a predetermined location across a top surface of the identification structure. In another embodiment, the one or more cuts are formed across two or more layers of the identification structure. In some embodiments, each cut of the one or more cuts are formed to have a predetermined depth. In one embodiment, the one or more cuts are defined as perforations. In another embodiment, the one or more cuts are formed as slits. In other embodiments, the one or more cuts are formed as weakened scoring. The plurality of physical elements aid in controlled propagation of any unauthorized physical, optical or electrical intervention so as to ensure that one or more of these interventions causes a detectable alteration in the corresponding attributes of the respective elements. For example, the physical intervention could be one or more acts of peeling, removing, replacing, covering, pulling, tearing, twisting, stretching, displacing, and heating layers of the identification structure.

In one embodiment, two or more electrical elements may be provided in the identification structure. In some embodiments, the two or more electrical elements provided in the identification structure are selected from a combination of a radio frequency identification device (RFID), RF-EAS, AM-EAS, Bluetooth, Bluetooth LE and the like. In one embodiment, one electrical element is an ultra-high frequency (UHF) element and a second electrical element is an electronic article surveillance (EAS) element. In one embodiment, the UHF element is directly die cut onto a first layer immediately underlying the top layer and the EAS element is also assembled simultaneously on the first layer. In one embodiment, the EAS element is inserted into an intermediate plastic layer provided on the layer underlying the top layer. The UHF element helps in product tracing and monitoring and the EAS element provides anti-theft functionality.

FIG. 1 depicts a representational illustration of an identification structure 100. The identification structure 100 contains or includes a plurality of identification elements disposed in one or more layers thereof configured to undergo altered performance based on an intervention applied at one or more of the layers. For example, FIG. 1 is an illustrative block representation to show the various kinds of interventions that may affect different elements of the identification structure 100. FIG. 1A illustrates how a physical intervention such as peeling of the identification structure secured on a product can alter the EAS element; for example, an antenna of the EAS element may be torn, making it inoperable, or its frequency may be changed.

FIG. 1B illustrates how another physical intervention such as peeling of a layer of the identification structure 100 can alter the function of the electrical element such as a RFID component; for example, the antenna can be torn in a way that the RFID component of the identification structure is unreadable.

FIGS. 1C and 1D illustrate how an optical element may be altered by the attempt to alter or change the label by an intervention. For example, the 2D barcode or QR code may be ripped, torn or stretched, all of which can change both the visual and machine readable properties. Other effects can include a change of color using microencapsulated inks or dies, where the optical elements are disrupted, or a change in a holographic sticker. It will be appreciated that the element being changed may not be visible at normal optical frequencies, for example a printed UV fluorescent ink or a near IR adsorbing ink, so the person attempting to alter or remove the label may not be aware of its presence.

FIG. 1 illustrates the different possible ways in which the different elements of the identification structure 100 can undergo alterations in their respective attributes or in a combination of their attributes due to either physical, electrical or optical interventions or a combination of interventions.

In order to counter the different interventions, the identification structure 100 is configured in a manner such that the intervention is propagated in a specific and controlled manner so that no element is completely damaged and/or a signature of the detectable alteration in the corresponding attribute of the respective element is left in the identification structure. Therefore, not only can an unauthorized intervention be easily detected but also original product information may be gathered.

In one embodiment, methods for detecting an unauthorized intervention with the identification structure are described. In some embodiments, the method involves configuring the identification structure such that the identification structure interacts with an intervention. For example, FIGS. 2A-2C illustrate how the elements such as the optical elements 201, the electrical elements 202 and the physical elements 301 (shown in FIGS. 3A and 3B) can be placed in the same or different layers of the identification structure 100 for interaction with an intervention.

Figure 2A:
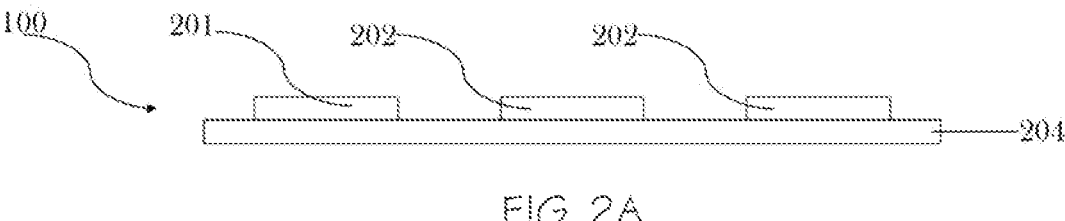
FIG. 2A depicts a first embodiment of the identification structure illustrating the location of different identification elements therein.
Figure 2B:
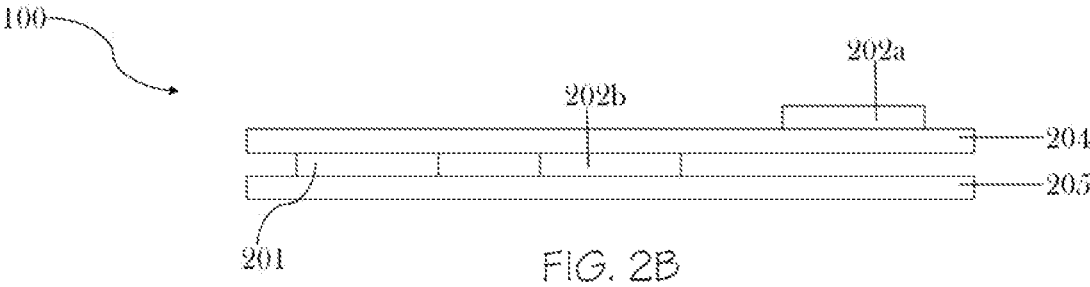
FIG. 2B depicts a second embodiment of the identification structure illustrating the location of different identification elements therein.
Figure 2C:
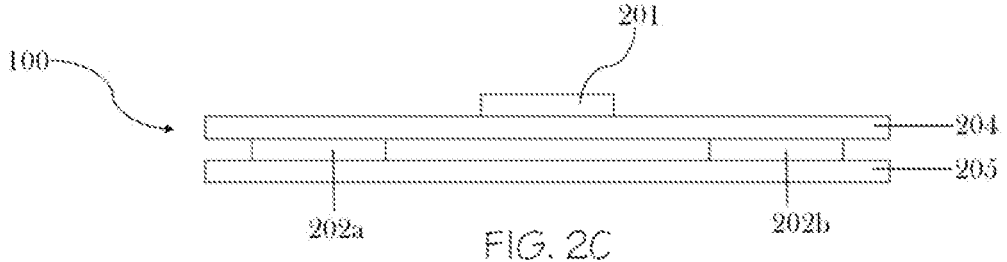
FIG. 2C depicts a third embodiment of the identification structure illustrating the location of different identification elements therein.

FIG. 2A illustrates a first embodiment of the identification structure depicting the placement of one optical element 201, and two electrical elements 202 in a single layer of the identification structure 100. For example, the optical element 201 and the two electrical elements 202 may be disposed on a top layer 204 of the identification structure 100. FIGS. 2B and 2C illustrate a second and third embodiment of the identification structure depicting one element being disposed on a top layer 204 of the identification structure and two elements being disposed in a first layer 205 immediately underlying the top layer 204. For example, in one embodiment and as illustrated in FIG. 2B, one electrical element such as an EAS component 202a may be provided on the top layer 204 and another electrical element such as a RFID component 202b and an optical element 201 such as a QR code may be provided on the layer 205 immediately underlying the top layer 204. In another embodiment and as illustrated in FIG. 2C, one optical element 201 such as a 2D barcode may be provided on the top layer 204 and two electrical elements 202 such as the RFID component 202b and the EAS component 202a may be provided on the first layer 205 immediately underlying the top layer 204.

Figure 3A:
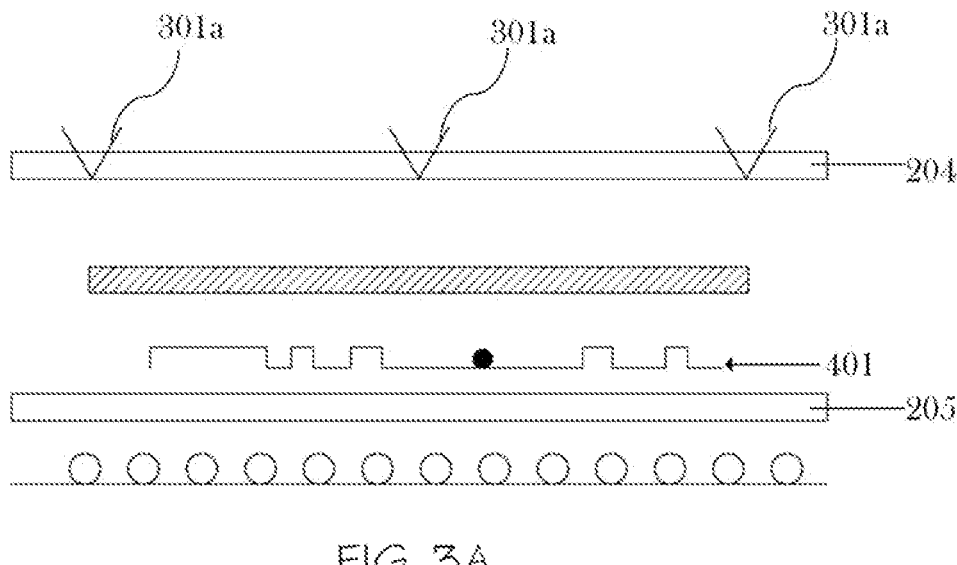
FIG. 3A illustrates a detailed view of the identification structure depicting the different layers thereof in accordance with one embodiment of the present subject matter.
Figure 3B:
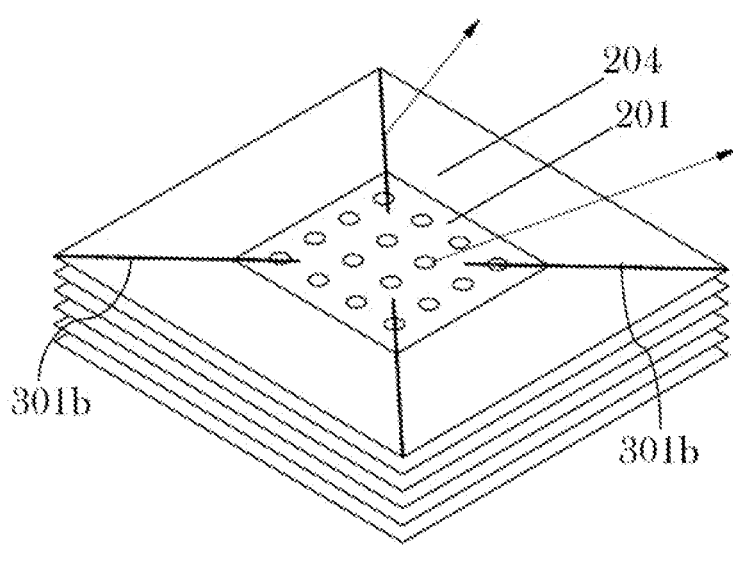
FIG. 3B illustrates a top perspective view of the identification structure depicting in detail a top layer thereof in accordance with one embodiment of the present subject matter.

Further, as illustrated in FIGS. 3A and 3B, the identification structure 100 includes a plurality of physical elements 301 disposed at select or specific locations across the surface of different layers of the identification structure 100. In some embodiments, the plurality of physical elements 301 is selected from one or more of cuts, perforations, weakened scoring, slits, embossing or the like. In one embodiment (as illustrated in FIG. 3A), the plurality of physical elements 301 are defined as a perforation 301a running across the top layer 204 of the identification structure. In another embodiment (as illustrated in FIG. 3B), the plurality of physical elements 301 are defined as slits 301b formed on the top layer of the identification structure. Preferably, the perforation 301a and the slits 301b are formed or located around one or more elements provided on the top layer 204 of the identification structure 100. For example, FIG. 3B illustrates the slits 301b around the optical element 201 such as a QR code. Specifically, the physical elements 301 have a predetermined depth. In some embodiments, the physical elements 301 are deep enough so as to extend into the layers underlying the top layer 204. In some embodiments, the depth of each of the cuts or perforations is decided based on the substrate material on which the cuts/perforations are formed and also on the kind of element placed near the cuts or perforations.

Figure 4A:
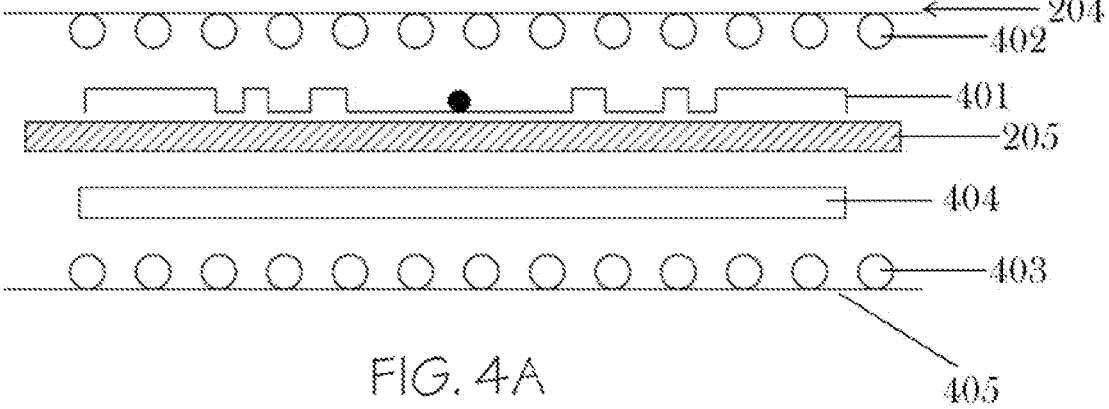
FIG. 4A illustrates an exploded view of the identification structure as per an embodiment of the present subject matter.
Figure 4B:
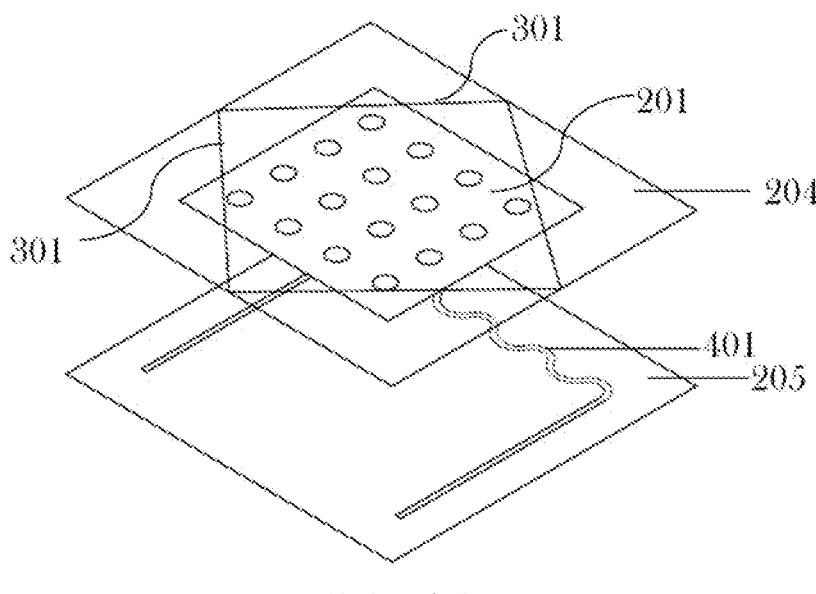
FIG. 4B illustrates an exploded view of the identification structure as per an embodiment of the present subject matter.

FIGS. 4A and 4B illustrate the construction of the identification structure 100 including the location of the physical elements with respect to the other elements such as the optical and electrical elements. Specifically, FIG. 4A illustrates an exploded view of an exemplary identification structure 100. In this embodiment, the top layer 204 of the identification structure 100 is made of paper and the physical elements 301, such as cuts, are formed around the optical element 201 such as a QR code (shown in FIG. 4B). Further, a second electrical element of the two or more electrical elements 202 is provided in the first layer 205 immediately underlying the top layer of the identification structure. For example, in the present embodiment and as illustrated in FIG. 4A a RFID component such a UHF antenna (e.g., dipole antenna) 401 is provided on the first layer 205 of the identification structure. In come embodiments, the first layer 205 is, or contains paper, such as natural (e.g., cellulosic) or synthetic papers. It should be appreciated that in other embodiments, the top layer and the first layer immediately underlying the top layer can be made of materials such as polypropylene, polyester and the like.

FIG. 4A illustrates an exploded view of an exemplary identification structure. The top layer 204 made of paper is coated with a functional adhesive 402 on its lower surface. The top layer 204 is secured to the first layer 205 through the functional adhesive 402. In one embodiment, one electrical element such as the RFID component including an RFID UHF antenna 401 is disposed on a first surface of the layer 205 immediately underlying the top layer. Further, the second electrical element, such as an RFID-EAS antenna 404, is formed on a second surface of the first layer 205. In another embodiment, both the RFID UHF antenna 401 and the RFID-EAS antenna 404 may be formed simultaneously on the same surface of the first layer 205. Further, a liner 405 made of a sustainable material and provided with a functional adhesive 403 on its upper surface is secured to the first layer 205. Printed adhesive(s) and deadened adhesive(s) can be placed selectively in different layers of the identification structure.

Figure 5:
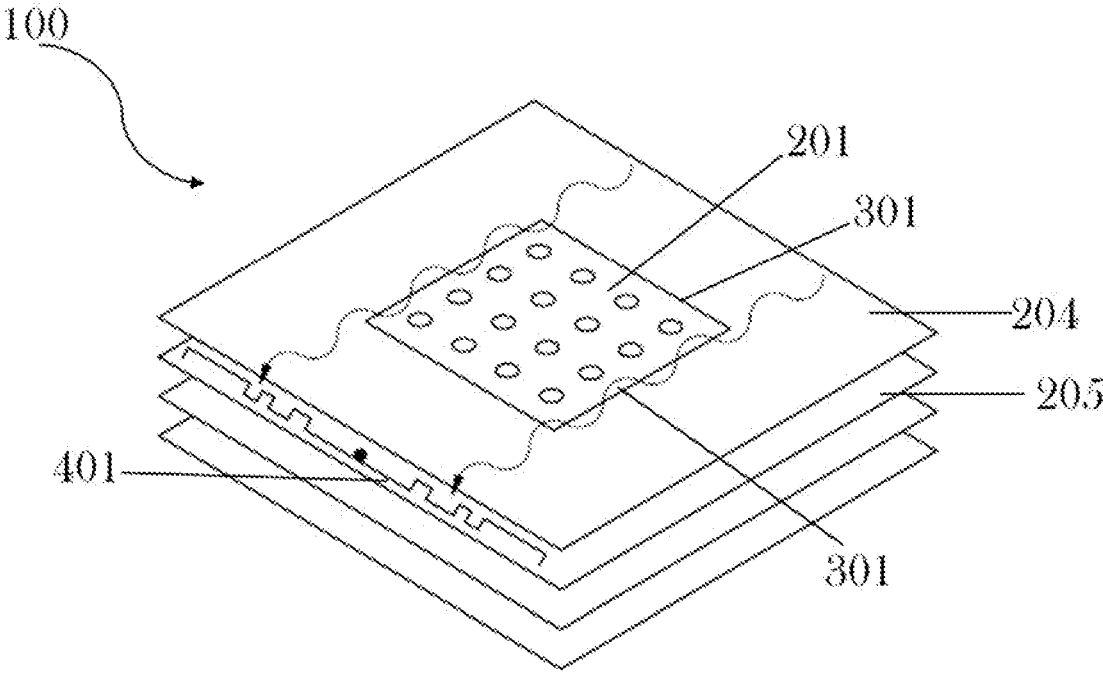
FIG. 5 illustrates a detailed view of the identification structure to illustrate how parts of the structure are disrupted during a tampering attempt.

As illustrated in FIG. 4B, the plurality of physical elements 301 such as cuts having predetermined depth is formed around the optical element 201. In some embodiments, the cuts are formed to have a predetermined depth so that they cut only through the top layer 204 of the identification structure. In some other embodiments, the cuts are formed to have a predetermined depth so that they cut through both the top layer and the immediately adjacent layer 205 of the identification structure. Presence of the physical elements 301 having predetermined depth ensures that any intervention including physical or electrical does not damage any of the elements completely. For example, FIG. 5 denotes an illustration of an exemplary identification structure 100 after it has been subjected to a physical intervention such as peeling. In this embodiment, the UHF antenna 401 disposed in the first layer 205 is only partially damaged and not completely damaged owing to the presence of the physical elements 301. Further, the damage caused to the antenna is detectable and the unauthorized intervention is identified. The selective placement and the depth of the physical elements 301 ensure that the intervention is propagated in a manner such that one of the layers of the identification structure is ripped more easily than the other, leaving the other layers intact, and thereby protect the identification elements contained in the layers that are intact. The presence of the physical elements also ensures that the physical intervention leaves a mark of tampering that can be visually recognized.

Methods for detecting unauthorized intervention with the identification structure 100 are also described herein. The method further involves propagating the intervention in such a way as to cause a detectable alteration in any predetermined attribute associated with the identification structure. For example, the predetermined attribute associated with identification structure could be a physical one, an electrical one, an optical one and the like or combinations thereof. Further, the alteration in the predetermined attributes can be detected by physical, electrical or optical assessments or by a combination of these assessments.

For example, when a physical intervention, such as peeling of the identification structure, causes damage to a portion of the RFID component (e.g., such as the antenna, wherein the antenna is torn in a way that the RFID component of the identification structure is unreadable), the presence of the physical elements 301 having a predetermined depth ensures that the antenna is not completely damaged and only a change in the operating frequency of the antenna occurs. Specifically, the damage is propagated in a specific way through the layers of the identification structure such that the far field long range reading will be disabled but near field reading is retained or vice versa. The antenna can have its frequency changed in a detectable fashion; for example, before tampering, the peak operating frequency of the tag may be in the region of 868 MHz; after tampering the peak may be in the region of 910 MHz. A suitably equipped RFID reader can detect if the sensitivity differential is positive or negative, and hence determine if a tampering event has occurred.

In further embodiments, the RFID chip is equipped with ports that can detect an event such as a change in capacitance between two connections or a change in resistance. The damage caused by a fraud/theft event can alter the state, for example, by breaking a connection or altering or changing the distance between the lines forming a capacitor. This data can be read from the RFID tag at a number of locations as needed, such as when the product is being displayed, at the POS or using a reader at a store exit. Thus, the change in the operation of the electrical component of the identification structure can be easily detected and the intervention can be identified.

Similarly, when during a physical or electrical intervention, some alteration occurs in the EAS element; for example, an antenna of the EAS element may be torn, making it inoperable; the presence of the physical elements 301 having controlled cut depth ensures that the antenna is not completely damaged and only a change in the operating frequency of the antenna occurs. For example, a frequency change would occur for an RF-EAS device, which is, in its operating state designed to resonate at 8.2 MHz; before mechanical force is applied, the frequency may be in the region of 6 MHZ, making the EAS non-functional or having reduced sensitivity. After mechanical force is applied, the EAS is tuned to 8.2 MHz, hence maximizing its detectability after the label is tampered with.

What has been described above includes examples of the claimed subject matter. It may be, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter may be intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of detecting unauthorized intervention in an identification structure, the method comprising:

configuring the identification structure with a plurality of identification elements such that one or more of the identification elements interact with the intervention;

propagating the intervention through any one or more of the identification elements and along different layers of the identification structure in a manner such as to cause a propagation of the intervention in a controlled manner so that the unauthorized intervention leaves behind a signature of a detectable alterations in corresponding attributes of any one or more of the identification elements, and in a manner such that at least one of the identification elements is retained intact with no damage; and detecting the alteration in the corresponding attributes by one or more assessments.

2. The method of claim 1, wherein the intervention is any of a physical intervention, an electrical intervention or any combinations thereof.

3. The method of claim 1, wherein the corresponding attributes are properties of the one or more of the identification elements selectively positioned in the identification structure, the identification elements being selected from optical elements, electrical elements, physical elements and combinations thereof.

4. The method of claim 3, wherein the attributes are associated with physical, mechanical, material properties resulting from a configuration of the identification structure or from the configuration of one or more of the identification elements.

5. The method of claim 3, wherein configuring the identification structure comprises selectively positioning the optical elements, the physical elements and the electrical elements on the different layers of the identification structure.

6. The method of claim 3, wherein configuring the identification structure comprises selectively positioning the optical elements and the physical elements along a top layer of the identification structure.

7. The method of claim 3, wherein configuring the identification structure comprises selectively positioning the electrical elements in one or more layers underlying a top layer of the identification structure.

8. The method of claim 2, wherein the physical intervention is associated with one or more acts of removing, replacing, covering, mechanical force pulling, tearing, twisting, disabling, stretching, destructing, disrupting, displacing heating or peeling apart layers of the identification structure.

9. The method of claim 2, wherein the electrical intervention is associated with application of voltage or exposure to electromagnetic radiation.

10. The method of claim 1, wherein propagating the intervention along the identification structure is associated with placement of one or more of the physical elements including cuts of a predetermined depth at select locations across the surface or different layers of the identification structure.

11. The method of claim 2, wherein the physical intervention or electrical intervention causes detectable alteration in an electrical attribute including resonance frequency or acoustic function of the identification elements.

12. The method of claim 1, wherein the one or more assessments for detecting the detectable alterations comprise visual assessment, optical assessment or electrical assessment.

13. The method of claim 3, wherein configuring the identification structure comprises selectively positioning the optical elements, the physical elements and the electrical elements on the different layers of the identification structure.

14. The method of claim 3, wherein configuring the identification structure comprises selectively positioning the optical elements and the physical elements along a top layer of the identification structure.

15. The method of claim 3, wherein configuring the identification structure comprises selectively positioning the electrical elements in one or more layers underlying a top layer of the identification structure.

16. An identification structure for detecting unauthorized intervention, the unauthorized intervention being a physical intervention, an electrical intervention or a combination thereof, the identification structure comprising:

a plurality of layers stacked together; and a plurality of identification elements selected from a group comprising physical elements, electrical elements, optical elements, and combinations thereof, with the plurality of identification elements being selectively positioned on different layers of the plurality of layers for interaction with the intervention, wherein a top layer of the plurality of layers provided with the physical elements having a predetermined depth for propagating the intervention along different layers of the identification structure in a manner such as to cause a propagation of the intervention in a controlled manner so that the unauthorized intervention leaves behind a signature of a detectable alteration in a corresponding attribute of any one or more of the identification elements, and in a manner such that at least one of the identification elements is retained intact without damage.

17. The identification structure of claim 16, wherein the plurality of layers comprises the top layer, and one or more layers underlying the top layer.

18. The identification structure of claim 16, wherein the electrical elements are selected from a group comprising a radio frequency identification device (RFID), RF-EAS, AM-EAS, Bluetooth, Bluetooth LE or combinations thereof.

19. The identification structure of claim 16, wherein the electrical elements are selectively positioned in the one or more layers underlying the top layer.

20. The identification structure of claim 16, wherein the optical elements comprise symbols or patterns adapted to be scanned by an optical scanning device.

21. The identification structure of claim 16, wherein the physical elements comprise cuts having the predetermined depth and extending from the top layer into one or more layers underlying the top layer.

22. The identification structure of claim 16, wherein the physical elements comprise cuts having the predetermined depth extending only along the top layer.

23. The identification structure of claim 16, wherein the physical elements are selected from at least one or a combination of a perforation, weakened scoring, slits, and embossing.

24. The identification structure of claim 16, wherein the top layer is made of paper.

25. The identification structure of claim 16, wherein the one or more layers underlying the top layer are made of paper.

26. The identification structure of claim 16, wherein the plurality of layers is stacked together with adhesive coating between the layers, and wherein the adhesive coating is selectively deadened along the layers.

27. The identification structure of claim 16, wherein the optical elements are selectively positioned on the top layer.

28. The identification structure of claim 16, wherein the optical elements comprise any of a quick response code (QR code), bar code including 2D bar code, surface texture, color, hologram, encapsulated ink, symbol, appearance, and indicia or combinations thereof.

29. The identification structure of claim 17, wherein the electrical elements comprising one electrical element as an RFID element and a second electrical element as an electronic article surveillance (EAS) element selectively positioned in the one or more layers underlying the top layer.

30. The identification structure of claim 27, wherein the optical elements comprise any of a quick response code (QR code), bar code including 2D bar code, surface texture, color, hologram, encapsulated ink, symbol, appearance, and indicia or combinations thereof.

31. The identification structure of claim 16, wherein the attribute is associated with physical, mechanical, or material properties resulting from the configuration of the identification structure or from the configuration of one or more of the identification elements.

32. The identification structure of claim 16, wherein the physical intervention is associated with one or more acts of removing, replacing, covering, mechanical force pulling, tearing, twisting, disabling, stretching, destructing, disrupting, displacing heating or peeling apart layers of the identification structure.

33. The identification structure of claim 16, wherein the electrical intervention is associated with application of voltage or exposure to electromagnetic radiation.

34. The identification structure of claim 16, wherein the physical intervention or electrical intervention causes the detectable alteration in an electrical attribute including resonance frequency or acoustic function of the identification elements.

*    *    *    *    *